Jan. 18, 1966 F. BARANOWSKI, JR 3,229,540

GEARING ARRANGEMENTS

Filed Sept. 13, 1963 2 Sheets-Sheet 1

INVENTOR:
FRANK BARANOWSKI JR.

BY

Robert R. Strack

ATTORNEY

Jan. 18, 1966 | F. BARANOWSKI, JR | 3,229,540
GEARING ARRANGEMENTS
Filed Sept. 13, 1963 | 2 Sheets-Sheet 2
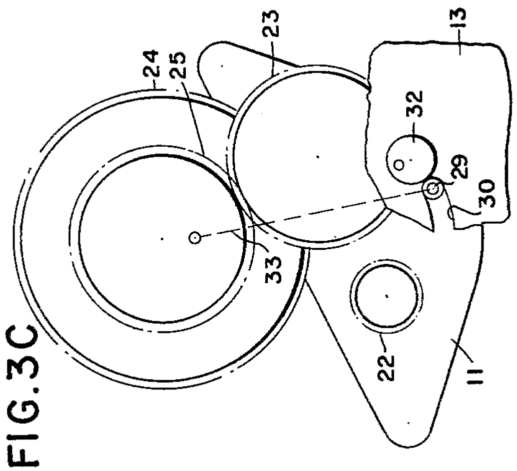
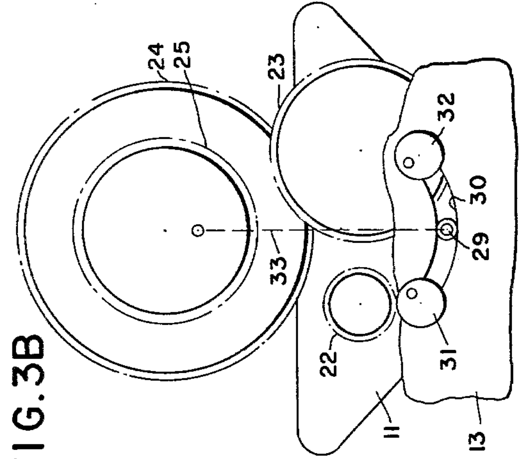
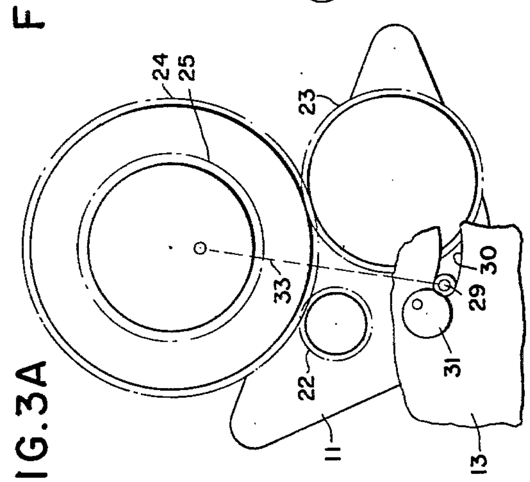
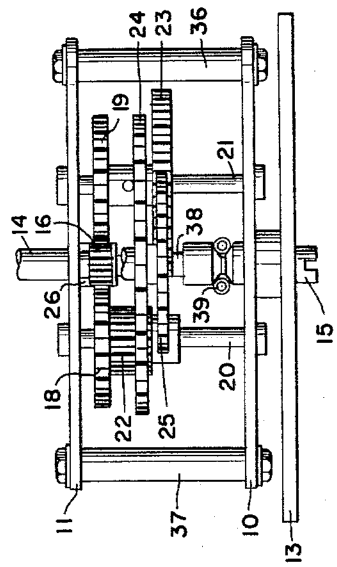
INVENTOR:
FRANK BARANOWSKI JR.
BY
Robert R Strack
ATTORNEY United States Patent Office 3,229,540
Patented Jan. 18, 1966

3,229,540
GEARING ARRANGEMENTS

Frank Baranowski, Jr., Lynnfield Centre, Mass., assignor to General Electric Company, a corporation of New York Filed Sept. 13, 1963, Ser. No. 308,898
5 Claims. (Cl. 74—354)

This invention relates to gearing arrangements and more particularly, to techniques for selectively modifying the driving/output speed ratio of respective shafts by modifying the gear trains interposed therebetween.

It will be apparent to those skilled in the art that the present invention is applicable to any system of gears wherein a drive shaft is coupled to provide torque to driven shafts. The invention has particular application, however, in fields of instrumentation wherein the ratio between input and output shaft speeds is a critical factor. In a number of instruments the input to be monitored is in the form of rotational position of a drive shaft and the output desired is in the form of either a rotational position of an output shaft or an element movement proportional to the input shaft movement. In the embodiment described hereinafter, the invention is incorporated into an instrument and the input stimulus is assumed to be supplied by a motor which responds to an analog control voltage representing the condition of a process being monitored. The output of the instrument may take the form of a chart which depicts the variation of the monitored process. Of course, the suggested utilization of the invention hereinafter described is merely illustrative and is in no way intended to limit the scope thereof.

When charting the variations of an input condition as shown in the embodiment, the degree of lateral translation of a pen or other device across the chart is controlled by the magnitude of an analog input voltage. The speed of such lateral movement is directly proportional to the rate at which the input varies. To indicate the passage of time the chart is moved orthogonally to the lateral pen movements at some known rate. Thus, as the chart moves past the pen, a line or tracing is developed which represents the variations of the input as a function of time. The ratio between the pen speed and the rate at which the input varies, which may be referred to as "response time," directly affects the resolution of the output. When the input is in the form of a motor shaft position, this ratio is determined by the gearing intermediate the motor drive shaft and the output shaft driving the pen. It has been found advantageous in normal operation to provide means for selectively choosing a response time in accordance with the resolution desired. In the past, relatively major readjustments of the intervening gear trains was required to provide this selectivity.

It is an object of the present invention to provide a gearing arrangement selectively operative to drive an output shaft at speeds having different relationships with respect to the speed of an input shaft.

Whenever a dual speed arrangement is contemplated, the question arises as to whether or not the shaft in speed relationships can be made during rotation of the drive shaft. Obviously, engagement and disengagement of gears at high speed is not desirable. This invention permits a shift during rotation of the input shaft by the provision of unique means that permit the gear change to be made between gears that are rotating at a considerably lower speed than the input drive shaft. Accordingly, the meshing is performed with a minimum of wear.

It is another object of the present invention to provide a dual speed gearing arrangement which may be selectively modified to change the ratio of the input to output speed of a gear train without disengaging the gears immediately controlled and driven by the input drive shaft.

Among the unique features of the present invention are included means for substituting a first gear train for a second gear train intermediate an input and an output shaft, wherein the amount of gear engagement between the respective gear trains and the gears on the output shaft is controlled to afford optimum mesh by means of a unique expedient.

Basically, the present invention relates to a swinging yoke type of gear arrangement wherein the yoke contains a pair of gear trains, each driven continuously by an input pinion. By a simple adjustment of this yoke, one or the other gear train is selectively brought into mesh with an output gear or gear train and retained in such meshing relationship by a unique toggle arrangement. Means are provided in the form of cam washers (as described hereinafter) which permit an operator to control the degree of gear engagement in accordance with the particular gears employed.

The novel features of the invention are set forth with particularity in the appended claims. The invention itself, however, both as to its organization and method of operation, together with further advantages and features thereof, may best be understood by reference to the following description taken in conjunction with the accompanying drawings wherein:

FIGURE 2 is a plan view of the gears in the illustrative embodiment in FIGURE 1; and FIGURES 3A, 3B, and 3C comprise a three-part schematic representation of the yoke in three possible positions showing the meshing relationship between the yoke gears and the output gears in each of these positions.

Figure 1:
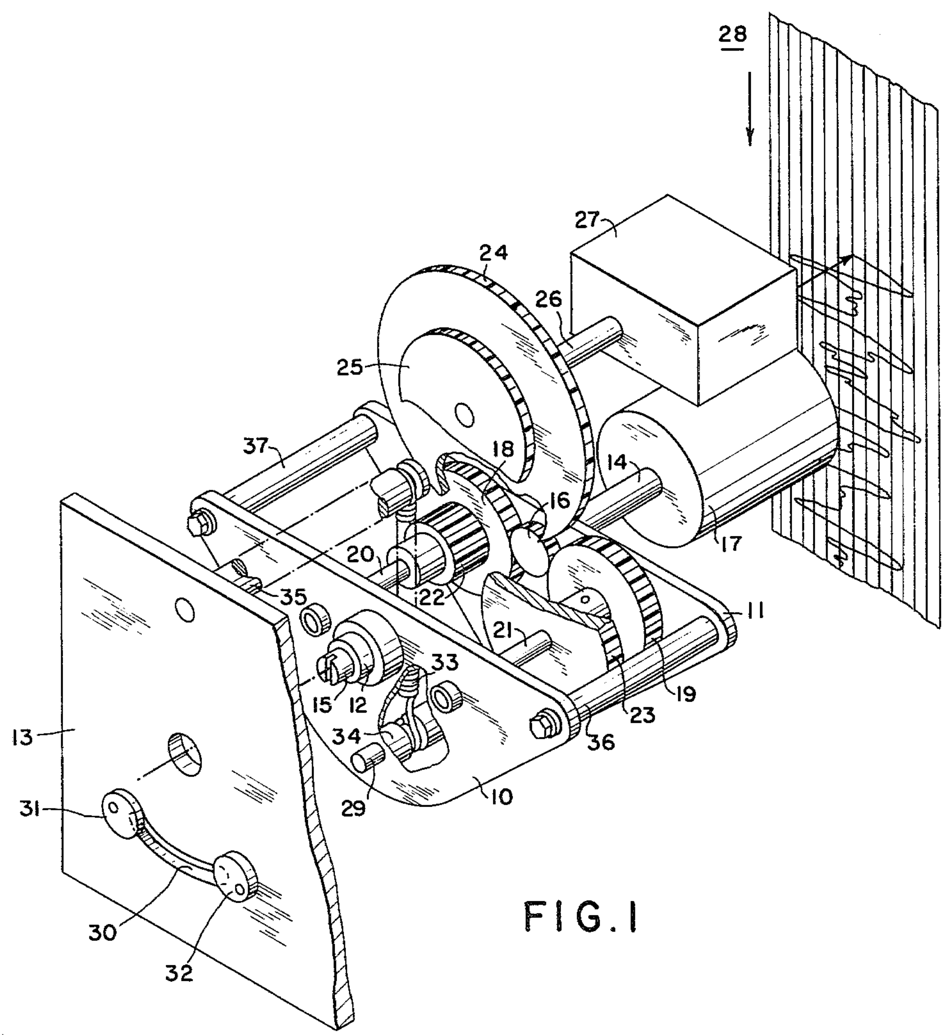
FIGURE 1 is a partially exploded view of an illustrative embodiment showing the unique yoke arrangement of the invention used as part of an indicating instrument.

The partially exploded view of FIGURE 1 shows an arrangement consisting of the gearing interposed between yoke face plates 10 and 11. The front of the yoke is pivotally supported by means of a bushing 12 inserted in a front supporting plate 13 and the rear of the yoke is coaxially supported by a bushing upon a motor shaft 14 or by a bushing in a rear supporting plate (not shown). Thus, the application of torque to a slotted head 15 which is adapted to protrude through supporting plate 13 is effective to pivot the yoke in either a clockwise or counterclockwise direction about the axis of motor shaft 14. The gearing mechanism within the yoke consists of an input pinion gear 16 driven by a motor 17 which is assumed to rotate in accordance with an analog input voltage developed by a system or process being monitored. Two continuously driven gears 18 and 19 are meshed with pinion gear 16 and are secured upon parallel shafts 20 and 21 that are mounted between yoke face plates 10 and 11. Also secured to shafts 20 and 21 are a pinion gear 22 and a driving gear 23, respectively. In the position shown (which is an unstable position, as will be understood more clearly hereinafter) output gears 24 and 25 are not engaged with either pinion gear 22 or gear 23. However, when the yoke is rotated in either a clockwise or counterclockwise direction, one of these gears will be engaged and accordingly, the output shaft 26, upon which gears 24 and 25 are secured, will have a torque applied thereto. For example, when the yoke is rotated in a clockwise direction, pinion gear 22 meshes with output gear 24 and output shaft 26 is driven.

For purposes of illustration, output shaft 26 is shown coupled through a gear box 27 which is inserted to indicate the possible intervention of other gearing not germane to the invention between the output shaft and the actual indicating elements of the illustrative instrument. The precise nature of the gearing mechanism within box 27 is of no relevance, but by way of example, it may include not only output gearing means but also servo control elements that may be coupled back to the system being monitored for modifications thereof in accordance with the information applied to driving motor 17. The output of box 27 may drive a pen type chart recorder such as shown generally at 28.

A pin 29 protrudes from the lower portion of yoke face plate 10 and is adapted for insertion through a slot 30 in supporting plate 13. The slot 30 is contoured to accommodate pin 29 when the yoke is moved either clockwise or counter-clockwise. The extent of travel of the yoke when rotated in either direction is governed by the length of the slot. In order to insure accurate mesh between driving pinion 22 and gear 23 with the output gears 24 and 25 respectively, the travel of pin 29 in slot 30 is restricted on either end by the means of cam washers 31, 32. These cam washers may be secured to supporting plate 13 by means of screws such as shown. Their circumferential contours are formed so that in accordance with the rotational position upon their supporting screws, more or less of the washer protrudes into the slot. In this way, the pin travel in the slot is selectively restricted and the yoke may be conveniently adjusted for optimum cooperation between the input and output gears.

A toggle arrangement is further included in order to substantially secure the yoke in either a first or second driving position in accordance with the selection of an operator. This toggle arrangement is in the form of a spring 33 coupled between shaft 34 which may be an extension of pin 29, and a fixed pin 35 on the upper portion of supporting plate 13. It will be appreciated that by means of this spring, when the yoke is rotated in a clockwise direction, the spring will be in tension and hold it so that pinion gear 22 is firmly meshing with driven gear 24 and when the yoke is rotated in a counter-clockwise direction, the spring once again is in tension and firmly secures driving gear 23 in mesh with output driven gear 25.

FIGURE 2 is a plan view showing the assembly of substantially all of the elements in FIGURE 1. This view clearly shows the spatial relationship between output gears 24, 25 and driving gears 22, 23. Pinion gear 16 from the motor is in mesh with continuously driven gears 18 and 19. Shafts 20 and 21 upon which the latter gears are mounted, further support pinion 22 and gear 23, respectively, for engagement with output gears 26 and 25, respectively. As seen in this plan view, the shaft 34 is undercut at point 38 to assure clearance of gear 23. Also, a groove 39 is provided in shaft 34 for securing the lower end of the spring 33. Of course, it will be appreciated that specific details such as the undercutting and the specific shape of the yoke may be varied without departing from the spirit and teaching of the present invention.

For a further appreciation of the invention, FIGURES 3A, 3B and 3C illustrate the positions the unique yoke of the present invention may assume. FIGURES 3A and 3C represent stable positions and FIGURE 3B represents the transitory central position in which the apparatus has thus far been portrayed. FIGURE 3A shows the yoke rotated to its clockwise position wherein pinion gear 22 is in engagement with output gear 24. In this position, it will be noted that pin 29 in slot 30 of supporting face plate 13 is bearing against washer cam 31; this washer cam having been positioned in order to insure proper mesh between pinion gear 22 and output gear 24. Although gear 23, as well as pinion gear 22, is rotating at this time, it is not in engagement with output gear 25 and consequently, it is not affecting the relationship between the input shaft speed and the output shaft speed.

In central FIGURE 3B, the yoke is shown in its transitory state between the first and second stable positions. It will be noted that in this position, neither pinion gear

22 nor driven gear 23 are in engagement with the output gears 24, 25. Further, the pin 29 in slot 30 is not secured and will be pulled either to the left or right by the tension of toggle spring 33.

FIGURE 3C shows the yoke in its counter-clockwise position wherein driving gear 23 is engaged with output gear 25. In this position, pin 29 is in contact with cam washer 32 on the right side of slot 30 and is, therefore, controlling the degree of mesh between the gears. It is also obvious from this figure that pinion gear 22 is not in contact with output gear 24 and accordingly, that the output shaft is controlled by gear 23 only.

With the preceding description in mind, it will be seen that applicant's invention incorporates the novel features of a swinging yoke gear arrangement wherein the input gears of the yoke are continuously driven by a pinion gear while the gear trains connected to an output gear are selectively engaged at a slower speed than the pinion gear speed. Also, it is seen that a simple cam washer technique is employed to control the contact between the meshing gears and to permit adjustments for wear and accommodation for different gears.

While the above described circuitry constitutes a particular embodiment of the invention it will, of course, be understood that it is not wished to be limited thereto since obvious modifications may be made therein within the scope of the teachings hereinbefore. It is contemplated in the appended claims to cover any such modifications as fall within the true spirit and scope of the invention.

What is claimed as new and desired to be secured by Letters Patent of the United States is:

1. A variable speed gearing arrangement comprising, an input gear, a first and second gear mounted on first and second parallel shafts respectively and in engagement with said input gear, a, third and fourth gear mounted on said first and second shaft respectively, a first and second output gear, and means for selectively positioning said first and second parallel shafts to establish, a first gear train comprising said input gear, said first and third gear, and said first output gear, or a second gear train comprising said input gear said second and fourth gear, and said second output gear, said means comprising a structure supporting said first and second parallel shafts and adapted to rotate about the axis of said input gear, and tension means for maintaining said structure in a first or second rotated position wherein said first and second gear trains are established.

2. A variable speed gearing arrangement comprising, an input gear, a first and second gear mounted on first and second parallel shafts respectively and in engagement with said input gear, a third and fourth gear mounted on said first and second shaft respectively, a yoke supporting said parallel shafts, a supporting plate, means for mounting said yoke with said supporting plate to permit rotation of said parallel shafts about the axis of said input gear, a slot in said supporting plate, a member affixed to said yoke and protruding into said slot whereby the rotational motion of said yoke is limited by the extent of said slot, first and second coaxially mounted output gears, and means for rotating said yoke in a first or second direction to bring said third or fourth gear into engagement with said first or second output gear respectively.

3. The gearing arrangement defined in claim 2 in combination with toggle means interconnecting said yoke and said supporting plate to maintain said yoke securely positioned at the end of said first or second direction of rotation.

4. The gearing arrangement defined in claim 3 in combination with means secured to said supporting plate and projecting into the ends of said slot to control the degree of rotational motion of said yoke.

5. A variable speed gearing arrangement comprising, an input gear, a first and second gear mounted on first and second parallel shafts respectively and in engagement with said input gear, a third and fourth gear mounted on said first and second shaft respectively, a yoke supporting said parallel shafts, a supporting plate, means for mounting said yoke with said supporting plate to permit rotation of said parallel shafts about the axis of said input gear, a slot in said supporting plate, projecting means affixed to said yoke and engaged in said slot whereby the rotational motion of said yoke is restricted by the extent of said slot, first and second coaxially mounted output gears, means for rotating said yoke in a first or second direction to bring said third or fourth gear into engagement with said first or second output gear respectively, means with a variable radius perimeter secured to said supporting plate at each end of said slot, said means projecting into said slot and defining the respective ends thereof, and a tension means interconnected between said projecting means and a point on said supporting means and adapted to be maximally stressed when said yoke is in an intermediate position between either end of said slot.

References Cited by the Examiner

UNITED STATES PATENTS

| | | | |
|---|---|---|---|
| 2,344,434 | 3/1944 | Wigglesworth et al. | 74—354 |
| 2,681,035 | 6/1954 | Browne et al. | 74—354 |
| 3,073,174 | 1/1963 | Swanson et al. | 74—354 |

DAVID J. WILLIAMOWSKY, *Primary Examiner.*

DON A. WAITE, *Examiner.*

H. S. LAYTON, *Assistant Examiner.*